(12) United States Patent
Lock et al.

(10) Patent No.: US 7,574,095 B2
(45) Date of Patent: Aug. 11, 2009

(54) COMMUNICATION CABLE ASSEMBLY AND INSTALLATION METHOD

(75) Inventors: Pieter Lock, The Hague (NL); Willem Griffioen, Ter Aar (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/747,573

(22) Filed: May 11, 2007

(65) Prior Publication Data
US 2007/0263960 A1    Nov. 15, 2007

(30) Foreign Application Priority Data
May 11, 2006    (NL)    .................................... 1031792

(51) Int. Cl.
G02B 6/00    (2006.01)
G02B 6/36    (2006.01)

(52) U.S. Cl. ......................... 385/139; 385/77

(58) Field of Classification Search ....................... None
See application file for complete search history.

(56) References Cited

U.S. PATENT DOCUMENTS

| | | | |
|---|---|---|---|
| 4,684,161 A | | 8/1987 | Enger et al. |
| 4,684,211 A | | 8/1987 | Weber et al. |
| 4,815,808 A | * | 3/1989 | Honma et al. .................. 385/69 |
| 5,474,277 A | | 12/1995 | Griffioen |
| 5,480,203 A | | 1/1996 | Favalora et al. |
| 6,100,470 A | | 8/2000 | Gretz |
| 6,396,993 B1 | | 5/2002 | Giebel et al. |
| 2001/0014197 A1 | * | 8/2001 | De Marchi .................... 385/77 |

(Continued)

FOREIGN PATENT DOCUMENTS

DE    3605389 A1    8/1987

(Continued)

OTHER PUBLICATIONS

Dutch Search Report for counterpart Dutch Application No. 1031792, completed on Jan. 26, 2007.

(Continued)

*Primary Examiner*—Omar Rojas
(74) *Attorney, Agent, or Firm*—Summa, Additon & Ashe, P.A.

(57) ABSTRACT

The invention relates to a cable assembly for communication purposes. The cable assembly includes a communication cable having a free, front end and a communication connector. The communication cable can be passed through a cable guide from a starting position to an end position with its free, front end. The communication cable includes at least one optical fiber that is coaxially surrounded by at least one cable sheath, within which at least one strain-relieving element is present. The communication connector can be mounted to the free end of the communication cable in communicative contact with the optical fiber.

To make it possible to pass the communication cable through the cable guide, the optical fiber is exposed at the communication cable's free, front end, which is fixedly surrounded by a connecting element. The connecting element can be mechanically connected to the communication connector after the communication cable has passed through the cable guide.

Thus, the communication connector can be connected in communicative contact to the optical fiber by way of a simple mechanical operation after the cable assembly has been led to the end position. Complex and costly finishing operations need not be carried out at the end user's location.

28 Claims, 9 Drawing Sheets

U.S. PATENT DOCUMENTS

| | | |
|---|---|---|
| 2001/0033730 A1 | 10/2001 | Fentress |
| 2003/0063868 A1 | 4/2003 | Fentress |
| 2005/0053342 A1 | 3/2005 | Melton et al. |
| 2007/0263960 A1 | 11/2007 | Lock et al. |
| 2008/0317410 A1 | 12/2008 | Griffioen et al. |

FOREIGN PATENT DOCUMENTS

| | | |
|---|---|---|
| DE | 9409660 U1 | 3/1995 |
| DE | 29505241 U1 | 7/1996 |
| DE | 102004019805 A1 | 11/2005 |
| EP | 1855134 A2 | 11/2007 |
| FR | 2677820 A1 | 12/1992 |
| GB | 2289805 A | 11/1995 |

OTHER PUBLICATIONS

European Search Report and Written Opinion in counterpart European Application No. 07009425, dated Jan. 30, 2009.

Griffioen, et al., "Preferrulized Cables for Blowing to Homes through ⅘ mm Microducts", Draka Comteq Cable Solutions, Gouda, Netherlands (Nov. 2007).

European Search Report and Written Opinion in commonly owned European Patent Application No. 08075719, dated Dec. 22, 2008 [Counterpart to U.S. Appl. No. 12/200,095].

* cited by examiner

COMMUNICATION CABLE ASSEMBLY AND INSTALLATION METHOD

CROSS-REFERENCE TO PRIORITY APPLICATION

This application hereby claims the benefit of pending Dutch Application No. 1,031,792 (filed May 11, 2006 at the Dutch Patent Office), which is hereby incorporated by reference in its entirety.

FIELD OF THE INVENTION

The invention relates to a cable assembly for communication purposes. The cable assembly includes a communication cable having a free, front end and a communication connector. The communication cable can be passed through a cable guide from a starting position to an end position with its free, front end. The communication cable includes at least one optical fiber that is coaxially surrounded by at least one cable sheath, within which at least one strain-relieving element is present. The communication connector can be mounted to the free end of the communication cable in communicative contact with the optical fiber.

BACKGROUND OF THE INVENTION

When optical fiber networks are installed, the network includes several connections for connecting the various end users. Various techniques are used for connecting the optical fiber from the main network to the homes of end users.

One such technique is leading the communication cable through to the end user's location, after which a so-called communication connector is fitted to the free end in situ. This is not an advisable technique, however, because it is necessary to expose the optical fiber by removing the cable sheath, to mount the exposed optical fiber end in the connector, and to polish the end face of the optical fiber so as to enable a good signal transmission.

In another technique, the cable assembly, including a communication cable provided with a communication connector, is passed through the cable guide to the end position as a pre-prepared assembly. The connector, which is likewise passed through the cable guide, has considerable diameter dimensions in comparison with the communication cable, making it necessary to install comparatively wide cable guides in the ground. In addition, it is difficult to pass such a cable assembly (i.e., having a complete connector mounted to the free, front end of the communication cable) through the cable guide. More specifically, the cable assembly must be passed through the cable guide from the starting position to its end position. This makes it necessary to carry out operations at the end position (e.g., in the end user's home), which is undesirable in view of the extent of planning and the man-hours involved.

Accordingly, it is an object of the invention to obviate the foregoing drawbacks of the existing installation techniques by providing an improved cable assembly. More specifically, it is an object of the invention to provide a cable assembly that makes it possible to lead individual cable assemblies from a central point to various end users, where the connector can be easily mounted.

SUMMARY OF THE INVENTION

According to the invention, therefore, the cable assembly is characterized in that, to make it possible to pass the communication cable through the cable guide, the optical fiber is exposed at the free, front end of the cable. This free end of the cable is fixedly surrounded by a connecting element, which can be mechanically connected to the communication connector after the communication cable has been passed through the cable guide.

Thus, the communication connector can be connected in communicative contact to the optical fiber by way of a simple mechanical operation after the cable assembly has been led to the end position. No complex and costly finishing operations (e.g., polishing) need to be carried out at the end user's location.

According to a further aspect of the invention, the cable assembly embraces a spring element that may be positioned around the optical fiber between the connecting element and the cable sheath(s). The spring element may be retained by the connecting element and a retaining sleeve arranged around the optical fiber. In this way, any loads exerted on the end faces of an optical fiber and the connecting element can be absorbed by the compression of the spring element, thus preventing damage to the connecting element and/or the optical fiber.

The connecting element may be provided with at least one recess in its circumferential surface. This recess may be configured as a circular recess formed in the circumferential surface in a special embodiment.

According to the invention, to make it easier to pass the cable assembly through the cable guide, the connecting element and the spring element may be protected by a protective element that is removal positioned at the free end of the communication cable.

According to the invention, the communication connector may include at least one sleeve that is positioned at (e.g., provided around) the connecting element for use in the final assembly of the cable assembly.

To facilitate the final assembly at the end position, the sleeve may be made up of two or more sleeve elements to be positioned at (e.g., provided around) the connecting element.

In a specific embodiment, for example, the sleeve may be provided with first and second cams that are spaced apart from one another and that extend toward the connecting element, with the first cam engaging in the recess formed in the connecting element and the second cam engaging the spring element.

A good mechanical connection of the connecting element to the sleeve or sleeve elements is obtained in this way. In addition, compression of the connecting element (e.g., as a result of a force being exerted on the end face) can be absorbed by the compression of the spring element.

In another specific embodiment, the second cam mates with a cam present on the retaining sleeve.

In order to absorb forces being exerted on the end face of the connecting element through compression of the spring element and movement of the sleeve, the length of the recess is typically greater than the length of the first cam as measured in the longitudinal direction of the cable.

The communication connector includes a connector housing positioned at the sleeve (e.g., around the sleeve) to facilitate further assembly operations.

According to the invention, to achieve proper retention and to prevent the connector housing from undesirably becoming detached from the sleeve, the connector housing includes a cam extending toward the sleeve. The cam engages in a recess formed in the outer circumference of the sleeve.

The maximum diameter of the cable assembly provided with the connecting element is typically between about 60 and 95 percent of the inner diameter of the cable guide and, more typically, between about 70 and 85 percent of the inner diameter of the cable guide.

In a further preferred embodiment, the maximum diameter of the cable assembly provided with the connecting element is less than 200 percent the diameter of the communication cable, and typically less than 150 percent the diameter of the communication cable (e.g., 120 percent or less).

The maximum diameter of the communication cable provided with the connecting element is less than or equal to the diameter of the cable assembly. To facilitate installation of the cable assembly, the diameter of the connecting element can match or be less than the diameter of the communication cable.

Furthermore, in other embodiments, the length of the connecting element is less than about ten times (10×) its maximum diameter, typically less than eight times (8×) its maximum diameter, and more typically less than six times (6×) its maximum diameter.

With the foregoing constructional dimensions, a proper and unhampered displacement of the cable assembly through the cable guide is possible even passing sharp bends in the cable guide.

The invention also relates to a device for collecting the front end of a cable assembly for communication purposes (i.e., a communication cable assembly) that includes a communication cable having a first free end (i.e., a free, front end). The communication cable may be passed through a cable guide from a starting position to an end position via its free, front end. According to the invention, the device includes an enclosure to be positioned at the end position of the cable guide, the enclosure being provided with one or more ventilation openings.

This facilitates the collection of the free, front end of the communication cable assembly when it is guided through the cable guide with the aid of a transfer medium (e.g., gas or liquid). More particularly, the enclosure is configured as a tube-shaped element having a first and second open end, wherein the first open end is provided with a collar-shaped clamp for coupling with the end position of the cable guide. This allows a quick and secure coupling and uncoupling of the device to the cable guide at the premises of the end user (i.e., where the cable assembly is to be installed).

In a further embodiment, the second open end is provided with a closure cap, which functions as an end stop for the free, front end of the cable assembly upon its emergence from the cable guide.

In a further improved embodiment, the device includes a collecting chamber that accommodates the enclosure, the collecting chamber serving to collect the transfer medium that is used in passing the cable assembly through the cable guide.

The invention further embraces a method for installing a communication cable assembly, such as a communication cable having a free end and that is built up of at least an optical fiber, which is coaxially surrounded by at least one cable sheath. The exemplary method includes the steps of: (i) providing a cable guide having a starting point and an end point located at an end users home; (ii) guiding the cable assembly with the optical fiber being exposed at the free, front end of the cable, which end is fixedly surrounded by a connecting element, from the starting point toward the end point using a transfer medium; (iii) collecting the free, front end of the cable assembly at the end point; (iv) mechanically connecting the free, front end of the cable assembly to a communication connector. In a further improvement, step (iii) further includes the step of collecting (at the end point) the transfer fluid employed during the guiding of the cable assembly through the cable guide as set forth in step (ii).

The foregoing, as well as other objectives and advantages of the invention, and the manner in which the same are accomplished, are further specified within the following detailed description and its accompanying drawings.

DETAILED DESCRIPTION

The present invention is described herein with reference to the accompanying drawings. As will be appreciated by those having ordinary skill in the art, these drawings are schematic representations, which are not necessarily drawn to scale. This invention may be embodied in many different forms and should not be construed as limited to the embodiments set forth herein. The embodiments disclosed are provided to convey the scope of the invention to those having ordinary skill in the relevant art. In this regard, like parts will be indicated by the same numerals in the accompanying drawings and following description.

Figure 1:
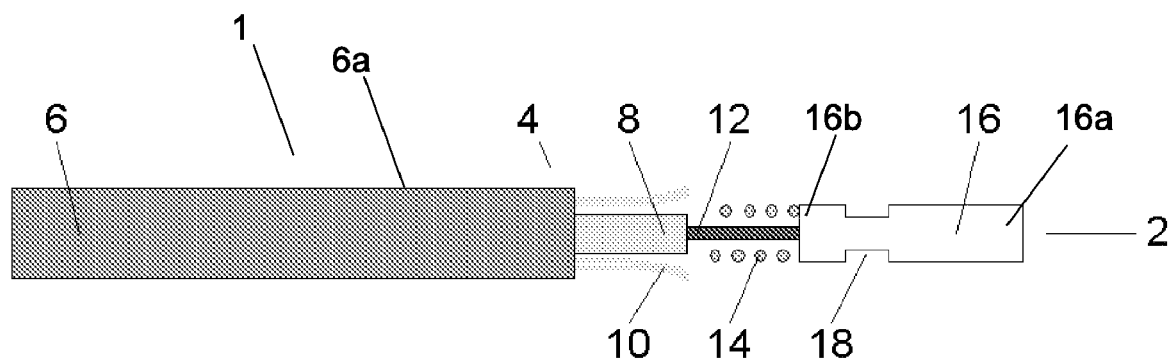
FIG. 1 depicts an embodiment of a cable assembly according to the invention.

FIG. 1 depicts a first embodiment of the communication cable assembly 1 according to the present invention. The cable assembly 1 is built up of a communication cable 6 that has a free, front end 4. The communication cable 6 can be passed through a cable guide (not shown) to an end position via its free end 4.

The communication cable 6 includes at least an optical fiber 12, which is coaxially surrounded by at least one cable sheath 6a as well as a strain-relieving sheath 10. In this embodiment, a buffer sheath 8 is provided around the optical fiber 12.

To make it easier to pass the communication cable 6 through the cable guide (not shown), the optical fiber 12 is exposed at the free, front end 4 of the cable 6. The free, front end 4 is fixedly surrounded by a connecting element 16. The connecting element 16 has a front-end face 16a and a back-end face 16b, which is in contact with the optical fiber 12. The front-end face 16a is centrally provided with a polished glass fiber surface, which can be placed into communication with a similar polished surface of a counter connector (not shown).

The connecting element 16 is provided with at least one recess 18, which is typically configured as a circular recess formed in the circumferential surface of the connecting element 16. (The function of the recess 18 will be further explained herein.). As depicted in FIG. 1, a spring element 14 is arranged around the optical fiber 12 between the connecting element 16 and the cable sheaths 8, 10, 6a. When the connecting element 16 is fully assembled, the spring element 14 functions to press the polished glass fiber surfaces together with a sufficient force—but not too much force as mechanical stresses may lead to cracking of the glass material—upon connection with a counter connector so as to effect a physical contact with a minimal optical signal attenuation of the connector connection.

The connecting element 16 and the spring element 14 form part of a semi-finished communication connector 2.

According to an embodiment of the invention depicted in FIG. 1, the cable assembly 1 is passed through a cable guide (not shown) in the direction of an end position from a central distribution point. At the end position, final assembly of the semi-finished communication connector 2 takes place so that the cable assembly 1 can be used for communication applications.

The cable assembly 1 is passed through an underground cable guide 22 (e.g., a cable conduit). See FIG. 2. To protect the components of the semi-finished communication connector 2 (e.g., the connecting element 16 and the spring element 14), a protective element 20 is used to pass the cable assembly through the cable guide 22. Protective element 20 protects the free end 4 of the cable assembly 1 as well as the connecting element 16 and the spring element 14.

The protective element 20 is removable in this embodiment. Once the cable assembly 1 has been passed through the cable guide 22 to the end position (e.g., an end user's meter cupboard), the protective element 20 must be removed, whereupon the final assembly of the semi-finished communication connector 2 (at this stage, made up of the connecting element 16 and the spring element 14) is to take place.

Upon final assembly and mounting of the communication connector 2, a kink protector 24 is slipped over the cable assembly 1. See FIGS. 1 and 3. Then, a shrink sleeve 26 is fitted around the outer cable sheath 6a, after which the connecting element 16 and the spring element 14 are protected by a connector housing (e.g., a connector sleeve 28). In the embodiment shown in FIG. 3, the connector sleeve 28 is built up of two sleeve elements 28a-28b, which can be fitted together over the connecting element 16 and the spring element 14 by way of a clamped connection or a snap connection.

Figure 3:
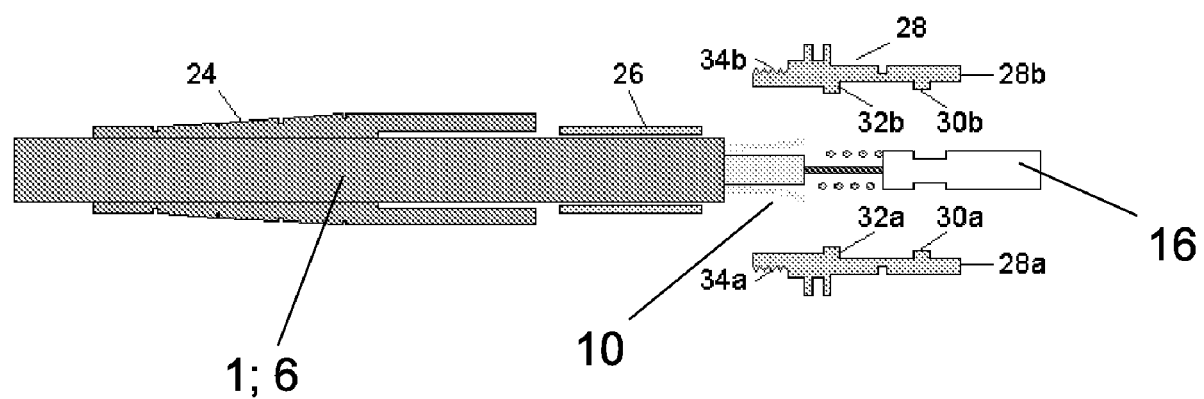
FIG. 3 depicts a first configuration of the cable assembly in the end position (i.e., placed for end use).
Figure 4:
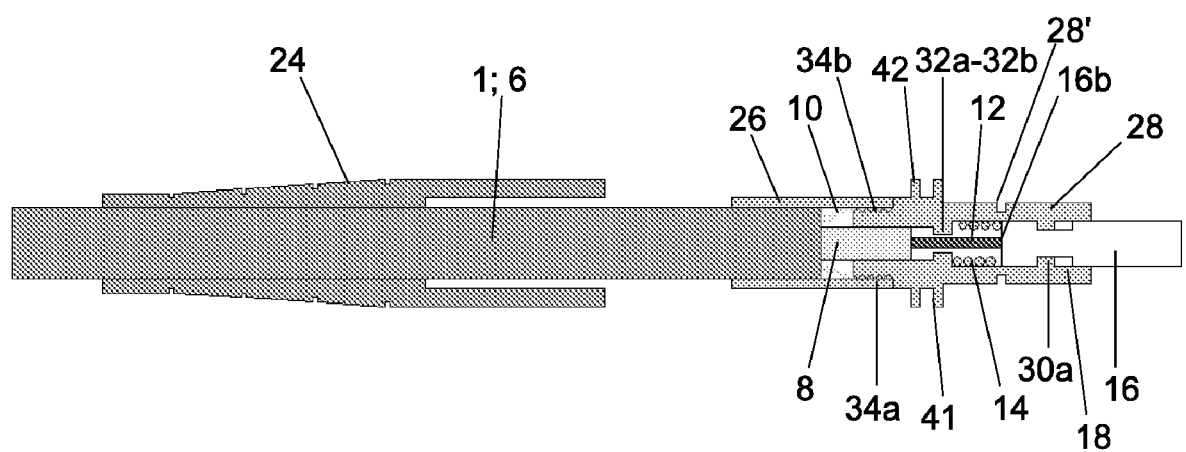
FIG. 4 depicts a second configuration of the cable assembly.
Figure 5:
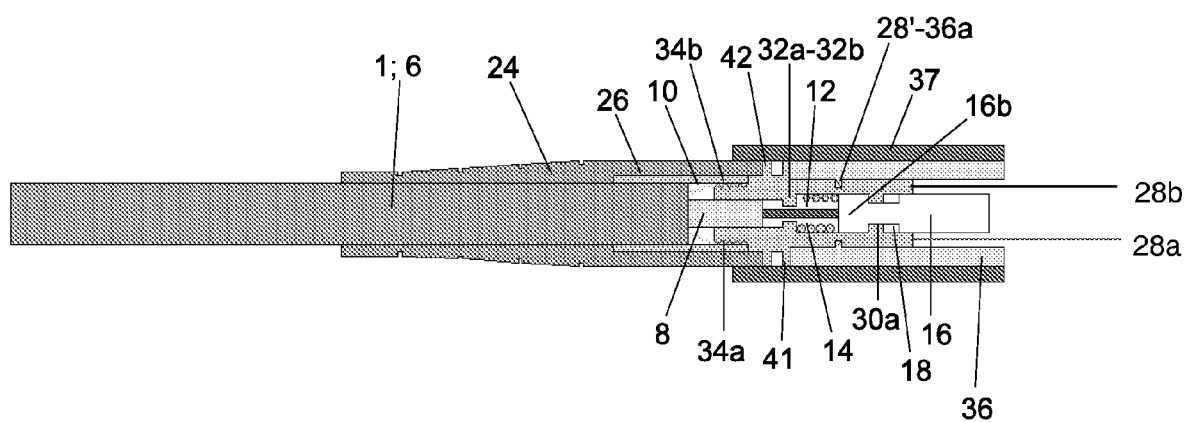
FIG. 5 depicts a third configuration of the cable assembly.

Each sleeve element 28a-28b—depicted in FIG. 3 as sleeve housing elements—is provided with a first inwardly oriented cam 30a-30b, which, upon placement around the connecting element 16, extends into the recess 18 of the connecting element 16. See FIGS. 3-5. As shown in FIG. 4 and FIG. 5, the length of the recess 18 is greater than the length of the first cam 30a-30b (as measured in the longitudinal direction of the cable 1).

Furthermore, the connector sleeve 28 (i.e., the two sleeve housing elements 28a-28b) is provided with a second inwardly oriented cam 32a-32b that is spaced from the first inwardly oriented cam 30a-30b. The second inwardly oriented cam 32a-32b engages the spring element 14. The spring element 14 is thus retained between the second cam 32a-32b and the back-end face 16b of the connecting element 16. This manner of retaining the spring element 14 (in conjunction with the larger dimension of the recess 18 in comparison with the first cam 30a-30b that extends into the recess 18) enables a slight degress of compression of the connecting element 16 as a result of the action of the spring element 14 when longitudinal forces are exerted thereon. In this way, the optical fiber 12 is not subjected to loads that may adversely affect it.

As depicted in FIG. 4, the strain-relieving sheath/element 10, which, for instance, may be made of aramid fibers formed around the surfaces 34a-34b, is provided with a screw, a knurled edge, or other friction-increasing surface. The strain-relieving sheath 10 is thus clamped onto the surfaces 34a-34b of the two sleeve housing elements 28a-28b by the shrink sleeve 26. In this way, a good strain-relieving connection between the communication connector 2 and the outer sheath 6a is realized. The kink protector 24 can be slid in the direction of the communication connector 2, so that it protects the shrink sleeve 26 and abuts a first upwardly oriented cam 42 provided on each sleeve housing element 28a-28b.

As depicted in FIG. 5, the free end of the connecting element 16 projecting from the connector sleeve 28 is further protected by way of a protective sleeve 36, which is provided with an inwardly oriented cam 36a. The inwardly oriented cam 36a precisely fits in the circular recess 28' formed in the external surface of the connector sleeve 28. The protective sleeve 36 thus abuts outwardly oriented cam 41, which forms part of each sleeve housing element 28a-28b. The final assembly of the communication connector 2 is completed by the provision of a connector envelope 37, which can be slid over the protective sleeve 36, the upright cams 41-42, and the kink protector 24.

In contrast to the embodiments shown in FIGS. 1-5, FIG. 6 discloses yet another embodiment of a cable assembly 1 in which the spring element 14 is not arranged around the optical fiber 12. Rather, spring element 14 is provided around element portion 43a between the connecting element 16 and the cable sheath 6a. As is depicted in the cross-sectional view of FIG. 6, the intermediate element 43 has a hexagonal outer circumference, around which the sleeve elements 28a-28b (not shown) can be clamped. Because of this surface configuration, sliding or rotating movement is not possible and there is no need for a cam-recess configuration.

Figure 6:
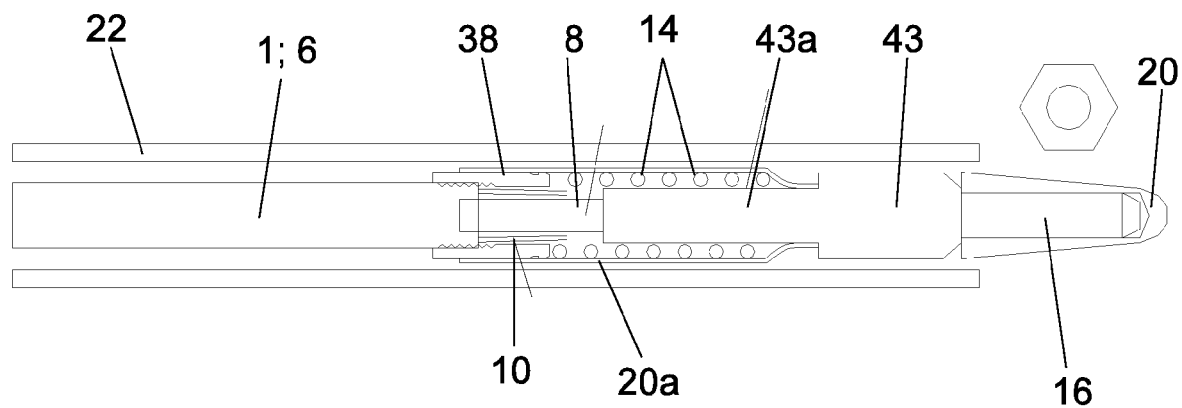
FIG. 6 depicts another embodiment of a cable assembly according to the invention.

In the embodiment depicted in FIG. 6, the connecting element 16 is protected by a protective element 20, while the spring element 14 and the ring 38 are protected by a protective retaining sleeve 20a. The ring 38 is disposed between the spring element 14 and the sheaths 6a, 8, 10 and is provided with internal screw thread for being fitted around the sheath 6a. The ring 38 functions to hold the protective retaining sleeve 20a in place. This construction results in a cable assembly having a reduced external diameter, which makes it easier to pass the assembly through a cable guide 22.

In another embodiment, the protective retaining sleeve 20a and the protective element 20 may be configured as one unit, which may have a slightly larger external diameter. A ring 38 may be provided between the spring element 14 (i.e., its upright, circular edge) and the sheaths 6a, 8, 10. See FIG. 7. After the cable assembly 1 has been moved to the end position and the kink protector 24 and the shrink sleeve 26 have been provided, the ring 38 is pressed down in the connector sleeve 28 (which need not be divisible in this embodiment). As a result, the spring element 14 is biased. The ring 38 fits in a recess 28d formed in the inner circumference of the sleeve housing elements 28a-28b.

Using the cable assembly according to the invention, a semi-finished communication connector can be passed through a cable guide together with the communication cable in an effective manner by exerting a pulling or pushing force, which may or may not be provided by a fluid medium (e.g., a gas) under pressure. In this way, no complex assembly operations need to be carried out at the end position.

Figure 8:
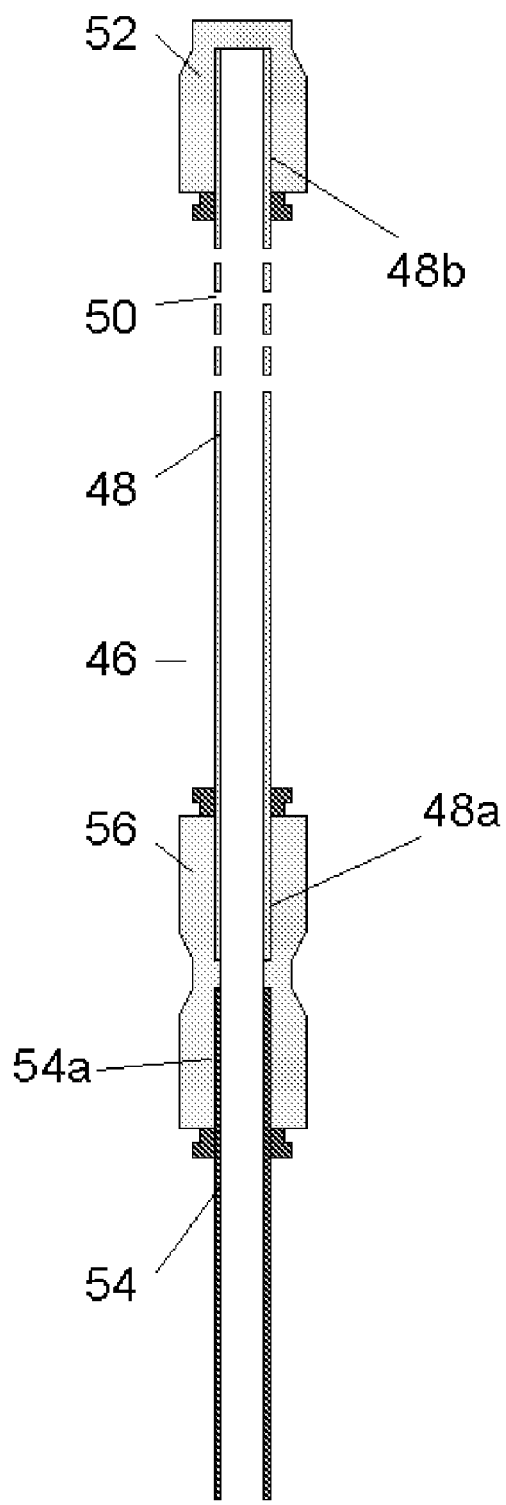
FIG. 8 depicts a device for collecting the free, front end of a communication cable assembly.
Figure 9:
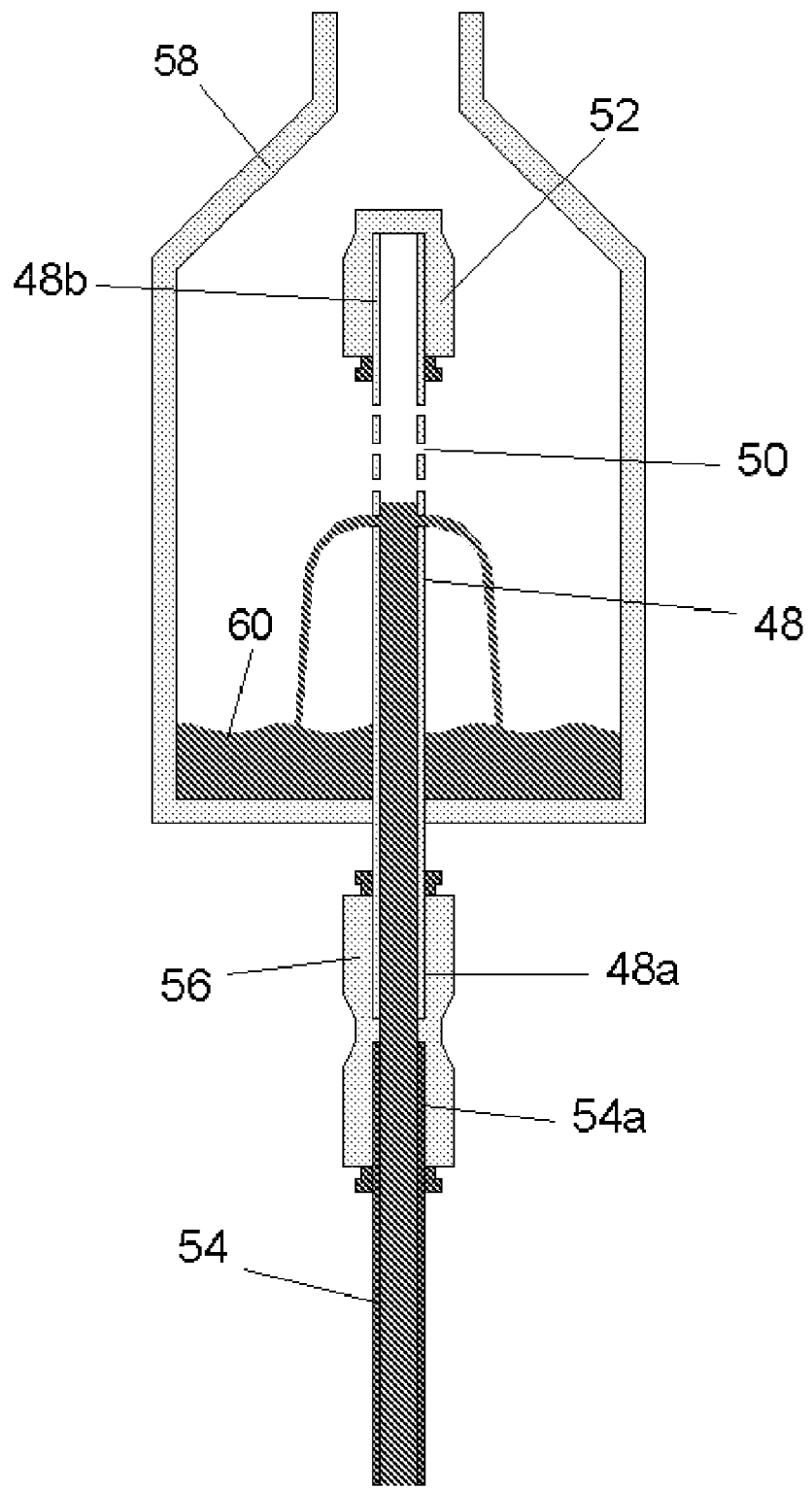
FIG. 9 depicts a device for collecting both the free, front end of a communication cable assembly and the installation transfer fluid.

FIGS. 8 and 9 disclose a device 46 for collecting the front end of a cable assembly according to the invention. The cable assembly is passed through a cable guide 54, which ends (e.g., terminates), for example, at home of an end user. The cable assembly is passed through the cable guide 54 using a transfer medium (e.g., pressurized air or liquid) from a starting position to an end position 54a, which is typically located inside the end user's home.

According to the invention, the device 46 includes an enclosure 48, which is to be provided at (e.g., positioned around) the end position 54a of the cable guide 54. The enclosure 48 is provided with one or more ventilation openings 50 that allow the passage of the transfer medium (e.g., pressurized air or liquid) out of the enclosure when passing the cable assembly through the cable guide 54.

The enclosure 48 is typically configured to be tube-shaped, having a first open end 48a and a second open end 48b, wherein the first open end 48a is provided with a collar 56 for coupling with the end position 54a of the cable guide 54. As depicted in FIGS. 8 and 9, the collar 56 is a collar-shaped clamp secured to the cable guide 54. The second open end 48b is provided with a closure cap 52.

In the embodiment shown in FIG. 9, the foregoing device further includes a collecting chamber 58, in which the enclosure 48 is accommodated. The collecting chamber 58 serves to collect the liquid transfer fluid 60 that is used for passing the cable assembly through the cable guide 54.

The cable assembly according to the invention has preferred dimensions that facilitate a proper and unhampered displacement of the cable assembly through the cable guide, even passing sharp bends in the cable guide.

Figure 2:
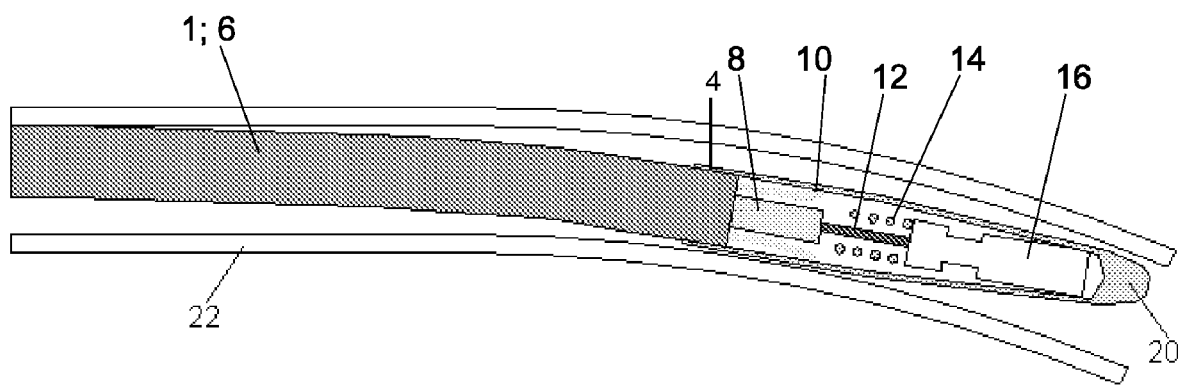
FIG. 2 depicts the cable assembly of FIG. 1 being passed through a cable guide.

The exemplary embodiments of the cable assembly shown in FIGS. 1-5 may be provided with a connecting element 16 having a diameter of about 1.25 millimeters. The cable 6 has a diameter of about 1.8 millimeters, whereas the protective element 20 is about 13 millimeters long and has a maximum diameter of about 2.2 millimeters. The complete cable assembly as shown in FIG. 2 can be blown through a cable guide 22 having a diameter ratio of about 4/3 (e.g., having an outside diameter of about 4 millimeters and inside diameter of about 3 millimeters) and having bends of radius down to 5 cm.

Yet another exemplary embodiment embraces a cable 6 having a diameter of about 1.8 millimeters with connecting element and a protective element 20 having a length of about 20.5 millimeters and a maximum diameter of about 2.85 millimeters. This cable assembly can be blown through a cable guide 22 having a diameter ratio of about 5/3.5 (e.g., having an outside diameter of about 5 millimeters and inside diameter of about 3.5 millimeters).

Figure 7:
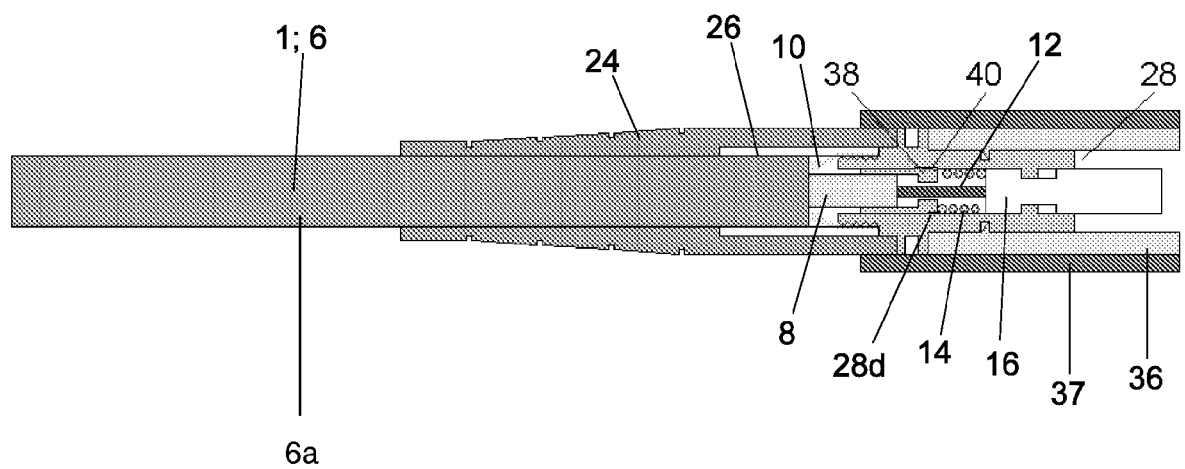
FIG. 7 depicts yet another embodiment of a cable assembly according to the invention.

The exemplary embodiment depicted in FIG. 7 has a reduced diameter as it uses two protective elements (i.e., element 20 placed over the connecting element 16 and protective retaining sleeve 20a placed over the rear assembly). The protective sleeve 20a can be made of soft material (e.g., a heat shrinkable plastic tube) that can later be easily cut away or otherwise removed. The cable 6 has a diameter of 1.8 millimeters and protective element 20 has a length of 20.5 millimeters and a maximum diameter of 2.65 millimeters. The cable assembly can be blown through a cable guide 22 having an outside diameter of about 4 millimeters and inside diameter of about 3 millimeters.

This configuration, without the protective sleeve 20a, has been tested by blowing in a 1030 meter trajectory with 180° bends with radius of 15 cm placed every 100 meters. With a blowing pressure of 10 bar, the speed at the end was still 14 meters per minute, reducing to 13 meters per minute when the connecting element 16 emerged from (i. e., exited) the cable guide 22. This indicates that no negative blowing effects—there was, in fact, a small positive effect—were found when installing with semi-finished connector.

The exemplary embodiment depicted in FIG. 8 embraces a cable 6 having a diameter of about 1.8 millimeters with a protective element 20 having a length of about 18.5 millimeters and a maximum diameter of about 3.25 millimeters.

This embodiment of the cable assembly can be blown through a cable guide 22 having an outside diameter of about 5 millimeters and inside diameter of about 3.5 millimeters. It is preferable, however, to use a larger cable guide having a larger diameter (e.g., an outside diameter of about 7.5 millimeters and inside diameter of about 5 millimeters).

In the specification and the figures, typical embodiments of the invention have been disclosed. Specific terms have been used only in a generic and descriptive sense, and not for purposes of limitation. The scope of the invention is set forth in the following claims.

The invention claimed is:

1. A cable assembly for communication purposes, comprising:
   a communication cable having a free, front end, wherein said cable can be passed through a cable guide from a starting position to an end position with its free, front end; and
   a communication connector comprising at least one sleeve positioned around a connecting element;
   wherein said cable is built up of at least an optical fiber, said optical fiber being coaxially surrounded by at least one cable sheath within which at least one strain-relieving element is present, and wherein said communication connector can be mounted to said free, front end of said cable in communicative contact with said optical fiber;
   wherein said at least one sleeve of said communication connector comprises spaced-apart first and second cams extending toward said connecting element, said first cam engaging a recess formed in said connecting element and said second cam engaging a spring element positioned around said optical fiber between said connecting element and said at least one cable sheath; and
   wherein, to make it possible to pass said cable through said cable guide, said optical fiber is exposed at said free, front end of said cable, said free, front end being fixedly surrounded by said connecting element, which can be mechanically connected to said at least one sleeve after said cable has passed through said cable guide.

2. A cable assembly according to claim 1, wherein said spring element is retained by said connecting element and a retaining sleeve positioned around said optical fiber.

3. A cable assembly according to claim 1, wherein said connecting element and said spring element are protected by a removable protective element that is positioned around said free, front end of said cable.

4. A cable assembly according to claim 1, wherein said first cam engages a circular recess formed in the circumferential surface of said connecting element.

5. A cable assembly according to claim 1, wherein said at least one sleeve comprises two or more sleeve elements positioned around said connecting element.

6. A cable assembly according to claim 1, wherein said second cam mates with a cam present on a retaining sleeve positioned around said optical fiber.

7. A cable assembly according to claim 1, wherein, in the longitudinal direction of said cable, the length of said recess formed in said connecting element is greater than the length of said first cam.

8. A cable assembly according to claim 1, wherein said communication connector comprises a connector housing positioned around said at least one sleeve.

9. A cable assembly according to claim 8, wherein said connector housing comprises a cam extending toward said at least one sleeve, said cam engaging in a recess formed in the outer circumference of said at least one sleeve.

10. A cable assembly according to claim 1, wherein the maximum diameter of the cable assembly provided with said connecting element is between about 60 and 95 percent of the inner diameter of said cable guide.

11. A cable assembly according to claim 10, wherein the maximum diameter of the cable assembly provided with said connecting element is between about 70 and 85 percent of the inner diameter of said cable guide.

12. A cable assembly according to claim 1, wherein the maximum diameter of the cable assembly provided with said connecting element is less than about 200 percent of the diameter of said communication cable.

13. A cable assembly according to claim 1, wherein the maximum diameter of the cable assembly provided with said connecting element is less than about 150 percent of the diameter of said communication cable.

14. A cable assembly according to claim 1, wherein the maximum diameter of the cable assembly provided with said connecting element is less than about 120 percent of the diameter of said communication cable.

15. A cable assembly according to claim 1, wherein the diameter of said connecting element is less than the diameter of said communication cable.

16. A cable assembly according to claim 1, wherein the length of said connecting element is less than about ten times its maximum diameter.

17. A cable assembly according to claim 1, wherein the length of said connecting element is less than about eight times its maximum diameter.

18. A cable assembly according to claim 1, wherein the length of said connecting element is less than about six times its maximum diameter.

19. An optical fiber cable assembly, comprising:
   an optical fiber cable comprising an optical fiber coaxially surrounded by a strain-relieving element and a cable sheath, said optical fiber cable having a free, front end that facilitates passage of said optical fiber cable through a cable guide from a starting position to an end position;
   a communication connector comprising (i) a semi-finished connector that includes a connecting element and a spring element and (ii) a connector sleeve that is positionable around said connecting element and said spring element, wherein said communication connector can be mounted to said free, front end of said optical fiber cable in communicative contact with said optical fiber;
   wherein said connector sleeve comprises first and second cams extending toward said connecting element, said first cam engaging a recess formed in said connecting element and said second cam engaging said spring element, said spring element positioned around said optical fiber between said connecting element and said cable sheath; and
   wherein said connector sleeve can be mechanically connected to said connecting element after said optical fiber cable has passed through said cable guide.

20. A cable assembly according to claim 19, further comprising a removable protective element that is positioned around said free, front end of said optical fiber cable, said removable protective element protecting said connecting element and said spring element during passage of said optical fiber cable through said cable guide.

21. A cable assembly according to claim 19, wherein said connector sleeve comprises two or more sleeve elements positioned around said connecting element and said spring element.

22. A cable assembly according to claim 19, wherein said second cam mates with a cam present on a retaining sleeve positioned around said optical fiber.

23. A cable assembly according to claim 19, wherein, in the longitudinal direction of said optical fiber cable, the length of said recess formed in said connecting element is greater than the length of said first cam.

24. A cable assembly according to claim 19, further comprising a protective sleeve that engages said connector sleeve.

25. A cable assembly according to claim 19, wherein the maximum diameter of the cable assembly provided with said connecting element is between about 60 and 95 percent of the inner diameter of said cable guide.

26. A cable assembly according to claim 19, wherein the maximum diameter of the cable assembly provided with said connecting element is less than about 150 percent of the diameter of said optical fiber cable.

27. A cable assembly according to claim 19, wherein the diameter of said connecting element is less than the diameter of said optical fiber cable.

28. A cable assembly according to claim 19, wherein the length of said connecting element is less than about ten times its maximum diameter.

* * * * *

UNITED STATES PATENT AND TRADEMARK OFFICE
CERTIFICATE OF CORRECTION

PATENT NO. : 7,574,095 B2
APPLICATION NO. : 11/747573
DATED : August 11, 2009
INVENTOR(S) : Pieter Lock and Willem Griffioen It is certified that error appears in the above-identified patent and that said Letters Patent is hereby corrected as shown below:

Column 2, Line 30 reads "element that is ~~removal~~ positioned at the free end of the"
and should read "element that is <u>removably</u> positioned at the free end of the"

Column 5, Line 62 reads "a slight ~~degress~~ of compression of the connecting element 16"
and should read "a slight <u>degree</u> of compression of the connecting element 16"

Signed and Sealed this

Twenty-third Day of March, 2010

David J. Kappos
*Director of the United States Patent and Trademark Office*